United States Patent [19]

Ommori et al.

[11] Patent Number: 4,743,993
[45] Date of Patent: May 10, 1988

[54] PLATE SPRING ASSEMBLY FOR A MAGNETIC RECORDING DISK CARTRIDGE

[75] Inventors: Shozo Ommori; Kengo Oishi, both of Odawara, Japan

[73] Assignee: Fuji Photo Film Co., Ltd., Japan

[21] Appl. No.: 864,209

[22] Filed: May 19, 1986

[30] Foreign Application Priority Data

May 20, 1985 [JP] Japan .................. 60-74657[U]

[51] Int. Cl.$^4$ .................. G11B 23/03; G11B 5/012; G11B 5/016; G11B 3/70
[52] U.S. Cl. .................. 360/133; 360/97; 360/99; 369/282; 206/444
[58] Field of Search .................. 369/282, 70-72; 360/97-99, 133; 206/444

[56] References Cited

U.S. PATENT DOCUMENTS

| 1,824,253 | 9/1931 | Acheson | 369/282 |
| 1,846,378 | 2/1923 | Acheson | 369/282 |
| 4,459,628 | 7/1987 | Barton | 360/133 |
| 4,503,474 | 3/1985 | Nigam | 360/133 |
| 4,532,564 | 7/1985 | Larson et al. | 360/133 |
| 4,590,532 | 5/1986 | Saito | 360/97 |

FOREIGN PATENT DOCUMENTS

| 0598176 | 1/1984 | Japan | 360/133 |
| 5954089 | 3/1984 | Japan | 360/97 |

OTHER PUBLICATIONS

IBM Technical Disclosure Bulletin, vol. 13, No. 5, Oct. 1970 "Disk Pack Locating Device" by A. Kulth, pp. 1242.

Primary Examiner—John H. Wolff
Assistant Examiner—Alfonso Garcia
Attorney, Agent, or Firm—Pasquale A. Razzano

[57] ABSTRACT

A magnetic recording disk cartridge comprises a magnetic recording disk accomodated for rotation in a casing. The magnetic recording disk is provided with a center core having a central opening into which a spindle of a magnetic recording/reproducing system is inserted to be drivingly engaged therewith. The center core comprises a core block provided with the central opening and a pair of slits formed in the wall portion of the core block defining the central opening and spaced from each other by a predetermined distance; and a plate spring which extends across the central opening and the opposite end portions of which are fitted into the slits and held therein so that the plate spring can be resiliently deformed in a direction radial to the magnetic recording disk. When the spindle is fitted into the central opening, the plate spring is pushed by the spindle to be resiliently deformed, and the outer pheripheral surface of the spindle is urged radially inwardly by the resiliency of the plate spring so that the rotational axis of the spindle coincides with the central axis of the magnetic recording disk.

3 Claims, 2 Drawing Sheets

PLATE SPRING ASSEMBLY FOR A MAGNETIC RECORDING DISK CARTRIDGE

BACKGROUND OF THE INVENTION

1. Field of the Invention

This invention relates to a magnetic recording disk cartridge, and more particularly to a magnetic recording disk cartridge comprising a magnetic recording disk having a center core and accommodated for rotation in a casing.

2. Description of the Prior Art

There has been in wide use, as a recording medium for computers, a floppy disk which comprises a magnetic recording disk consisting of a disk-like flexible base sheet formed of polyester resin and a magnetic material layer formed on each side of the base sheet. Information is recorded on the magnetic material layer by a magnetic head while the floppy disk is rotated.

Further, there has been put into practical use an electronic still camera in which a smaller floppy disk is used as a recording medium for recording images. The magnetic recording disk for the electronic still camera is small in diameter and extremely thin, and is provided with a center core fixed to the center of the base sheet. The magnetic recording disk is accommodated for rotation in a small casing to form a magnetic recording disk cartridge.

The center core of the magnetic recording disk is provided with a central opening into which a spindle of an electronic still camera, a reproducing system or the like is fitted to rotate the magnetic recording disk at a high speed. In order to precisely record image information on the magnetic recording disk, the center of the magnetic recording disk must coincide with the rotational axis of the spindle.

Conventionally, the spindle is brought into contact with the wall of the center core defining the central opening at a plurality of portions and one of the plurality of portions of the wall is in the form of a thin plate that has resiliency. The center core is molded in one piece of a resin material. When the spindle is fitted into the central opening, the thin plate is resiliently deformed and the outer peripheral surface of the spindle is urged radially inwardly by the resiliency of the thin plate so that the spindle is positioned in place with respect to the central opening of the center core, so that the spindle and the magnetic recording disk are coaxial with each other.

However, the conventional center core structure is disadvantageous in that when the thickness of the thin plate portion is reduced in order to provide sufficient flexibility, the moldability of the center core is lowered and the resilient force of the thin plate portion is weakened. Further, as it is formed of resin material, the center core has poor thermal resistance and durability. Thus, the conventional center core is not satisfactory as means for locating the spindle with respect to the magnetic recording disk.

SUMMARY OF THE INVENTION

In view of the foregoing observations and description, the primary object of the present invention is to provide a magnetic recording disk cartridge having a center core structure which can locate the spindle with respect to the magnetic recording disk with high reliability.

In accordance with the present invention, the center core comprises a core block provided with a central opening into which the spindle is inserted to be drivingly engaged therewith, and a pair of slits formed in the wall portion of the core block defining the central opening and spaced from each other by a predetermined distance; and a plate spring which extends across the central opening and the opposite end portions of which are fitted into the slits and held therein so that the plate spring can be resiliently deformed in a direction radial to the magnetic recording disk. When the spindle is fitted into the central opening, the plate spring is pushed by the spindle to be resiliently deformed, and the outer peripheral surface of the spindle is urged radially inwardly under the resiliency of the plate spring so that the rotational axis of the spindle coincides with the central axis of the magnetic recording disk.

The end portions of the plate spring may be fitted into the slits in any manner so long as the plate spring is resiliently deformed to exert a predetermined force on the spindle without any possibility of the plate spring being drawn from the slits when the spindle is fitted into the central opening. The pair of slits may be formed in any position though it is preferred that the both slits be positioned in one vertical plane. Further, the plate may be shaped so that it is brought into contact with the spindle at one portion or at a plurality of portions. Further, the plate spring may be formed of any material so long as it can meet the requirement described above though it is preferred that the plate spring be formed of metal for thermal resistance and durability.

DESCRIPTION OF THE PREFERRED EMBODIMENTS

Figure 1:
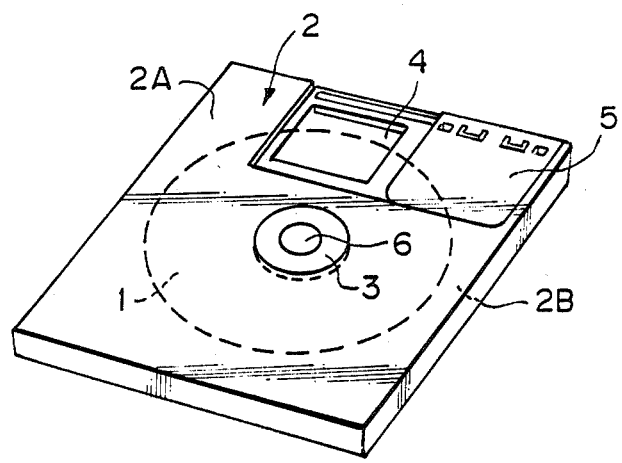
FIG. 1 is a schematic perspective view of a magnetic recording disk cartridge in accordance with an embodiment of the present invention.

In FIG. 1, a magnetic recording disk 1 is accommodated for rotation in a casing 2 formed by upper and lower halves 2A and 2B. The magnetic recording disk 1 is provided with a center core 3 integrally fixed to the center thereof. The center core 3 is provided with a central opening 6 as will be described in detail later. A head receiving opening 4 is provided on each side of the casing 2 to expose the magnetic recording disk 1 to give a magnetic head (not shown) access to the magnetic recording disk 1. A shutter 5 is mounted on the casing 2 for sliding movement between a closing position in which it closes the head receiving openings 4 and an opening position shown in FIG. 1 in which it opens the same to permit access of the magnetic head to the magnetic recording disk 1. When the magnetic recording disk cartridge of this embodiment is loaded in an electronic camera, a reproducing system or the like, the magnetic head of the system is brought into contact with the magnetic recording disk 1 through the head receiving opening 4, and a spindle 10 (FIG. 2) of the system is fitted into the central opening 6 of the center core 3 to be drivingly engaged with the center core 3. While the magnetic recording disk 1 is rotated by the spindle 10, information is recorded on the magnetic recording disk 1 by the magnetic head.

Figure 2:
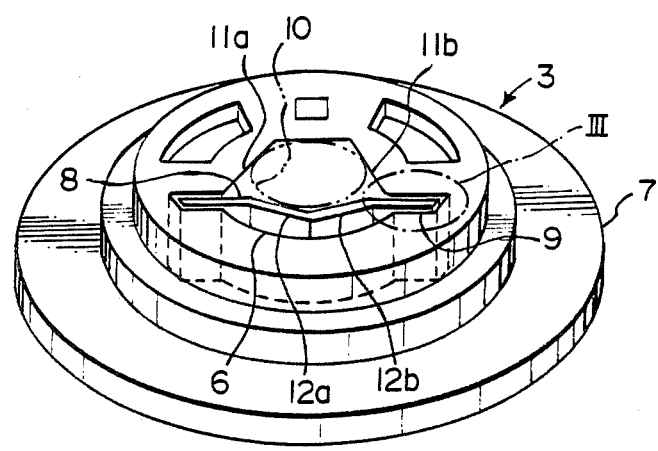
FIG. 2 is a perspective view showing in detail the center core of the magnetic recording disk cartridge shown in FIG. 1, FIGS. 3 to 5 are enlarged views each showing different examples of the part of the center core circumscribed by the chained line III in FIG. 2.

As clearly shown in FIG. 2, the center core 3 comprises a core block 7 formed by plastic molding, and a metal plate spring 8. The wall of the center core 3 defining the central opening 6 is provided with a pair of slits 9 which are substantially in a vertical plane away from the rotational axis of the spindle 10. The plate spring 8 has opposite end portions which are straight and held in the respective slits 9 of the center core 3 in a manner to be described later, and an intermediate portion which is bent to form a wide V-shape.

As the spindle 10 is inserted into the central opening 6, the plate spring 8 is resiliently deformed and the spindle 10 is urged, under the resilient force of the plate spring 8, toward a predetermined position in which the rotational axis of the spindle 10 coincides with the central axis of the center core 3. When the spindle 10 is in the predetermined position, adjacent wall portions 12a and 12b of the plate spring 8 forming the V-shape, and portions 11a and 11b of the wall defining the central opening 6 are all in contact with the outer peripheral surface of the spindle 10 as shown in FIG. 2.

When the spindle 10 is not in the central opening 6, the wall portions 12a and 12b of the plate spring 8 are displaced toward the center of the central opening 6 from the position shown in FIG. 2.

The end portions of the spring plate 8 are held in the corresponding slits 9 to permit resilient deformation of the spring plate 8 by a desired amount when the spindle 10 is inserted into the central opening 6. This can be obtained in various manners.

Figure 3:
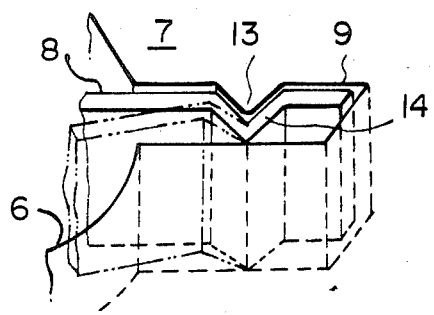

For example, a protrusion 13 is formed in each slit 9 to project toward the spring plate 8 from the spindle side wall portion to engage with a recess 14 provided on the spring plate 8 as shown in FIG. 3. When the spindle 10 is fitted into the central opening 6, the spring plate 8 is resiliently deformed as shown by the chained line in FIG. 3 with the both end portions being retained in the corresponding slits 9 by virtue of the engagement of the protrusion 13 and the recess 14.

Figure 4:
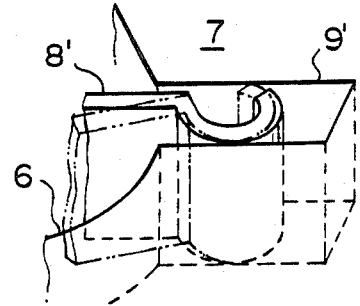

In another example shown in FIG. 4, each slit 9' is defined by a pair of parallel vertical wall portions and each end portion of the spring plate 8' is curled. When the spring plate 8' is resiliently deformed, rotation of the end portions in the slits 9' is permitted to some extent, thereby retaining the end portions of the spring plate 8' in the slits 9'.

Figure 5:
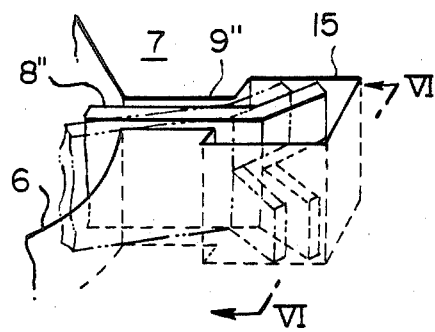

In still another example shown in FIG. 5, each slit 9" is enlarged at an inner portion 15 to form a shoulder facing the bottom of the slit 9" on each side of the slit 9". The upper and lower portions of each end portion of the spring plate 8" are bent in opposite directions to be engaged with one of the shoulders. When the spring plate 8" is resiliently deformed, the end portions of the spring plate 8" slide in the longitudinal direction of the spring plate 8".

Figure 6:
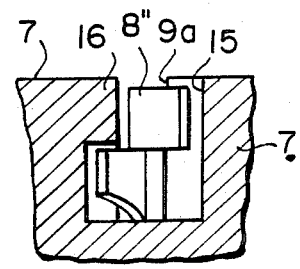
FIG. 6 is a cross-sectional view taken along line VI—VI in FIG. 5, and FIGS. 7 and 8 each show modifications of the plate spring.

It is preferred that each slit be provided with an undercut portion 16 to prevent the spring plate 8" from being drawn out from the slit in the vertical direction as indicated at 9a in FIG. 6. Otherwise, each end portion of the spring plate 8" must be resiliently pressed against the wall portion defining the slit to retain the spring plate 8" in the slit. The former arrangement is advantageous over the latter in that the end portions of the spring plate can slide in the slit more smoothly upon resilient deformation of the spring plate.

Figure 7:
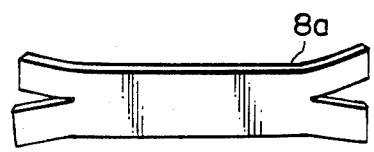
Figure 8:
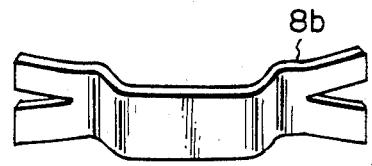

In the embodiment described above, the spring plate 8 is V-shaped. However, the spring plate 8 may be of various other shapes so long as the spindle 10 can be uniformly pressed against the wall portions 11a and 11b when the spindle 10 is fitted into the central opening 6. For example, the spring plate may be as shown in FIG. 7 or 8 (as respectively indicated at 8a and 8b in FIGS. 7 and 8) in shape.

We claim:

1. A magnetic recording disk cartridge comprising a mangetic recording disk accommodated for rotation in a casing about a central axis and provided with a center core having a central opening into which a compressible recording/reproducing spindle having an outer peripheral surface is insertable, said spindle is rotatable about a rotational axis and is inserted within the central opening to be drivingly engaged with the center core wherein said center core includes a core block provided with the central opening and a pair of slits which are generally in a vertical plane away from the rotational axis of the spindle and each have a notch portion, the pair of slits formed in a wall portion of the core block define the central opening and are spaced from each other by a predetermined distance; and a resilient plate spring which extends across the central opening and opposite end portions thereof, each having bifurcated free and portions that are fitted into the notch portion of the slits and held therein so that the plate spring can be resiliently deformed in a direction radial to the magnetic recording disk when the spindle is fitted into the central opening and the outer peripheral surface of the spindle is compressed inwardly under the resiliency of the plate spring so that the rotational axis of the spindle coincides with the central axis of the magnetic recording disk.

2. A magnetic recording disk cartridge as set forth in claim 1 in which an intermediate portion of the spring plate is V-shaped so that adjacent wall portions of the spring plate contact the spindle when the spindle is fitted into the central opening.

3. A magnetic recording disk cartridge as set forth in claim 1 in which said pair of slits are formed generally in the same vertical plane.

* * * * *